(12) United States Patent
Beccavin et al.

(10) Patent No.: US 8,910,511 B2
(45) Date of Patent: Dec. 16, 2014

(54) TIRE INNER LINER ANOMALY PROBE GROUNDING APPARATUS AND METHOD

(75) Inventors: Christian Albert Beccavin, Greenville, SC (US); Frank E. Gramling, Simpsonville, SC (US); David Andrew Judd, Mauldin, SC (US); Bradley D. Schober, Greer, SC (US)

(73) Assignees: Michelin Recherche et Technique S.A., Granges-Paccot (CH); Compagnie Generale des Etablissements Michelin, Clermont-Ferrand (FR)

( * ) Notice: Subject to any disclaimer, the term of this patent is extended or adjusted under 35 U.S.C. 154(b) by 0 days.

(21) Appl. No.: 13/822,097

(22) PCT Filed: Sep. 14, 2010

(86) PCT No.: PCT/US2010/048743
§ 371 (c)(1),
(2), (4) Date: Mar. 11, 2013

(87) PCT Pub. No.: WO2012/036674
PCT Pub. Date: Mar. 22, 2012

(65) Prior Publication Data
US 2013/0174657 A1    Jul. 11, 2013

(51) Int. Cl.
G01M 17/02    (2006.01)
(52) U.S. Cl.
CPC ..................... *G01M 17/02* (2013.01)
USPC .......................................................... 73/146
(58) Field of Classification Search
USPC ................................................ 73/146–146.8
See application file for complete search history.

(56) References Cited

U.S. PATENT DOCUMENTS

| 4,516,068 | A  | 5/1985  | Hawkinson, Jr. et al. |
| 4,520,307 | A  | 5/1985  | Weiss et al. |
| 6,050,136 | A  | 4/2000  | Hawkinson et al. |
| 6,304,090 | B1 | 10/2001 | Weiss |
| 6,312,539 | B1 | 11/2001 | Bohm |
| 6,600,326 | B2 | 7/2003  | Weiss |

(Continued)

FOREIGN PATENT DOCUMENTS

| JP | 62-149405   | 9/1987 |
| JP | 2000-009771 | 1/2000 |

(Continued)

OTHER PUBLICATIONS

Related Applications Form.

(Continued)

*Primary Examiner* — Andre Allen
(74) *Attorney, Agent, or Firm* — Dority & Manning, P.A.

(57) ABSTRACT

An apparatus and method for high voltage discharge testing of a tire is disclosed. In particular embodiments, a high voltage probe is maintained against the surface of a tire. The high voltage probe is energized and relative motion is provided between the surface of the tire and the high voltage probe. At the presence of an anomaly that penetrates the insulating material of the tire surface, an electrical discharge will occur between the conductive spring electrode and a reference electrode. The reference electrode is positioned adjacent the bead portion of the tire such that the electrical discharge will travel from the high voltage probe through the anomaly in the surface of the tire to one or more carcass plies in the tire. The carcass plies will carry the electrical discharge to the bead portion of the tire, where the electrical discharge will pass to the reference electrode.

17 Claims, 5 Drawing Sheets

(56) References Cited

U.S. PATENT DOCUMENTS

| | | | |
|---|---|---|---|
| 6,832,513 B2 | 12/2004 | Weiss | |
| 6,837,102 B2 | 1/2005 | Weiss | |
| 6,907,777 B2 | 6/2005 | Weiss | |
| 7,257,996 B2 | 8/2007 | Hassler et al. | |
| 2003/0188574 A1* | 10/2003 | Weiss | 73/146 |
| 2009/0078034 A1* | 3/2009 | Range et al. | 73/146 |
| 2013/0139581 A1* | 6/2013 | Range et al. | 73/146 |
| 2013/0162265 A1* | 6/2013 | Beccavin et al. | 324/558 |

FOREIGN PATENT DOCUMENTS

| | | |
|---|---|---|
| JP | 2000-343915 | 12/2000 |
| JP | 2000-174224 | 6/2001 |
| JP | 2002-337246 | 11/2002 |
| JP | 2013-543461 | 12/2005 |
| JP | 2006-317380 | 11/2006 |
| JP | 2008-524581 | 7/2008 |
| JP | 2012-017028 | 1/2012 |
| WO | WO 2008/150894 | 12/2008 |

OTHER PUBLICATIONS

International Search Report for PCT/US2010/048740, dated Nov. 5, 2010.

International Search Report for PCT/US2010/048743, dated Nov. 5, 2010.

* cited by examiner

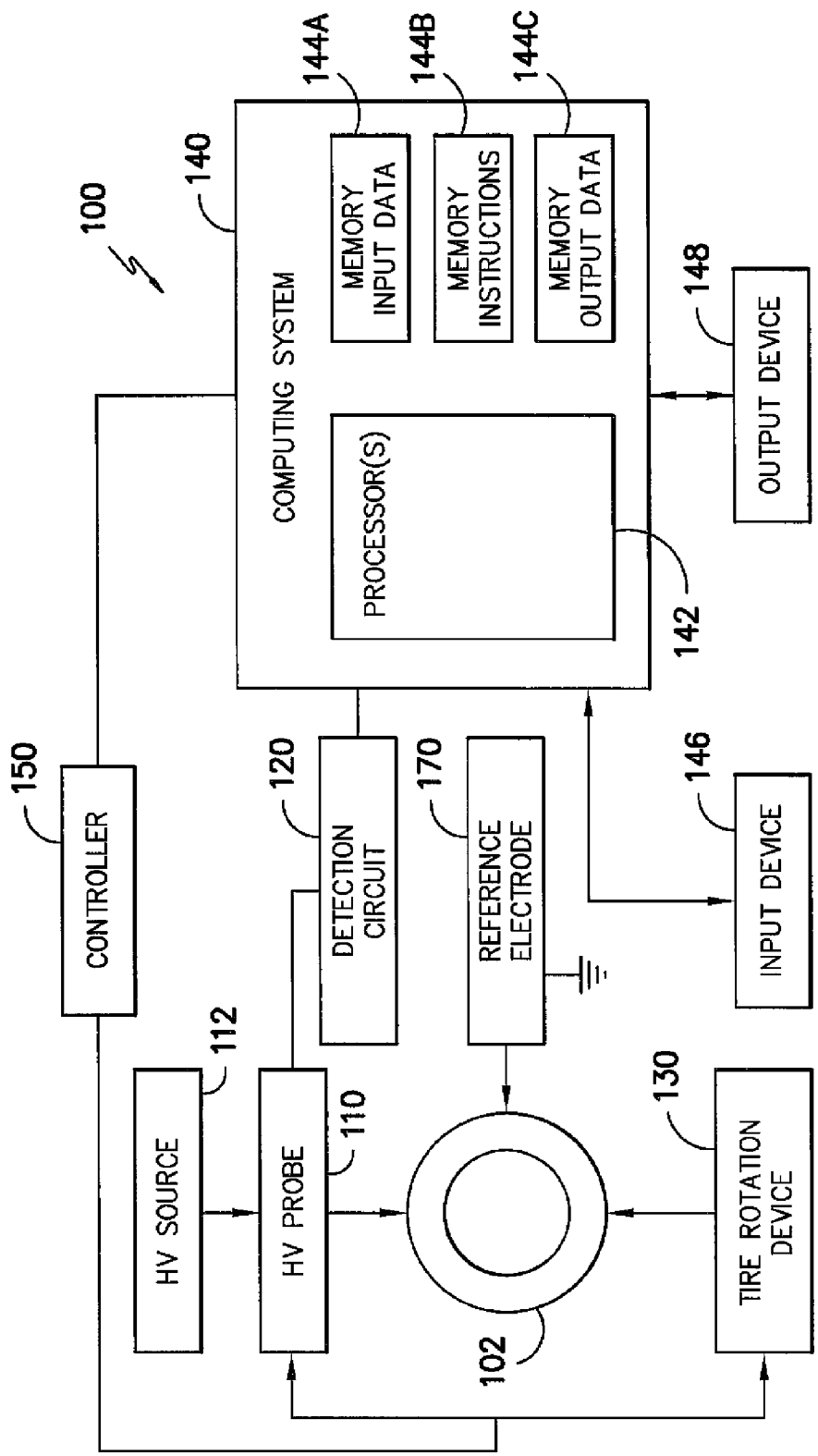
FIG. -1-

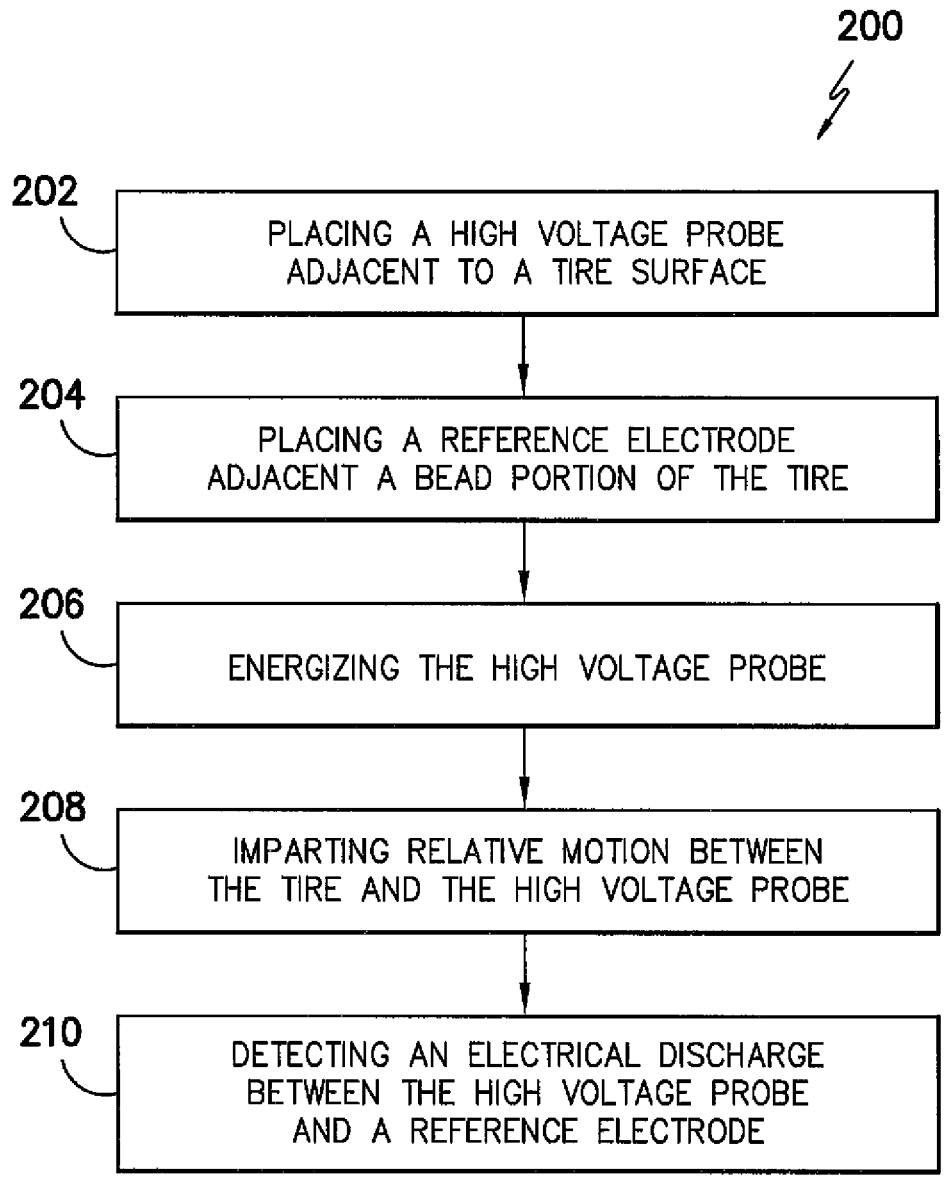
FIG. -2-

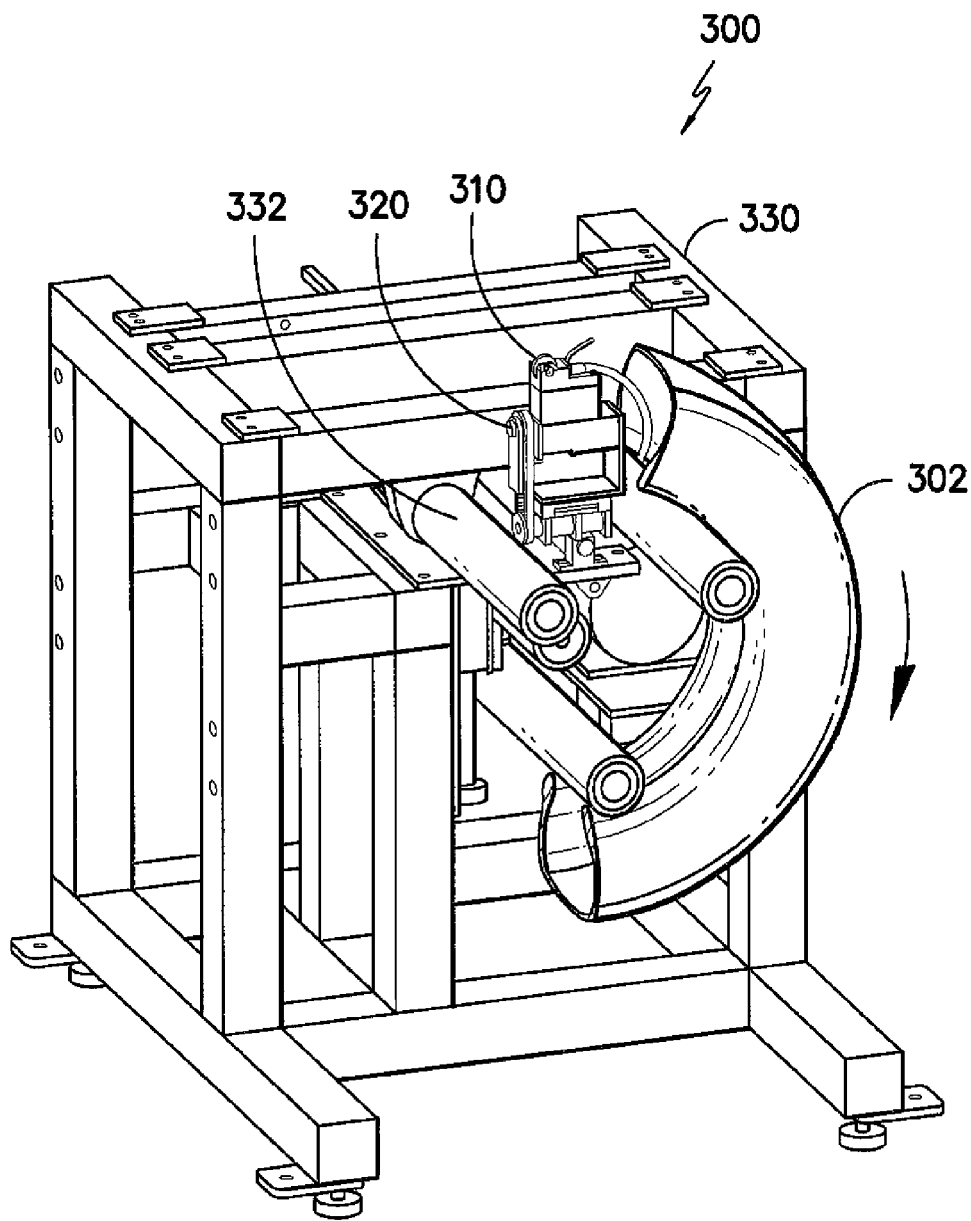
FIG. —3—

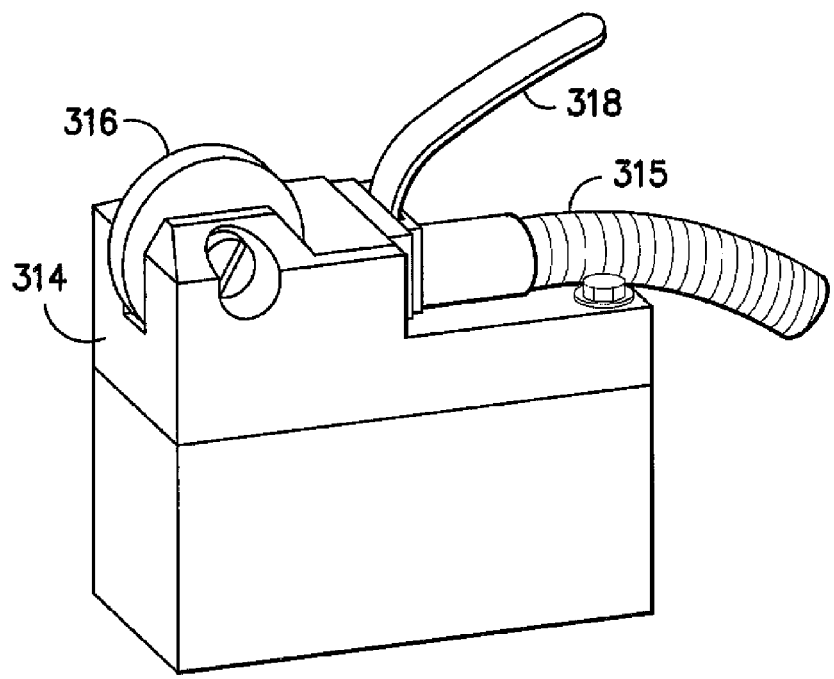
FIG. -4-
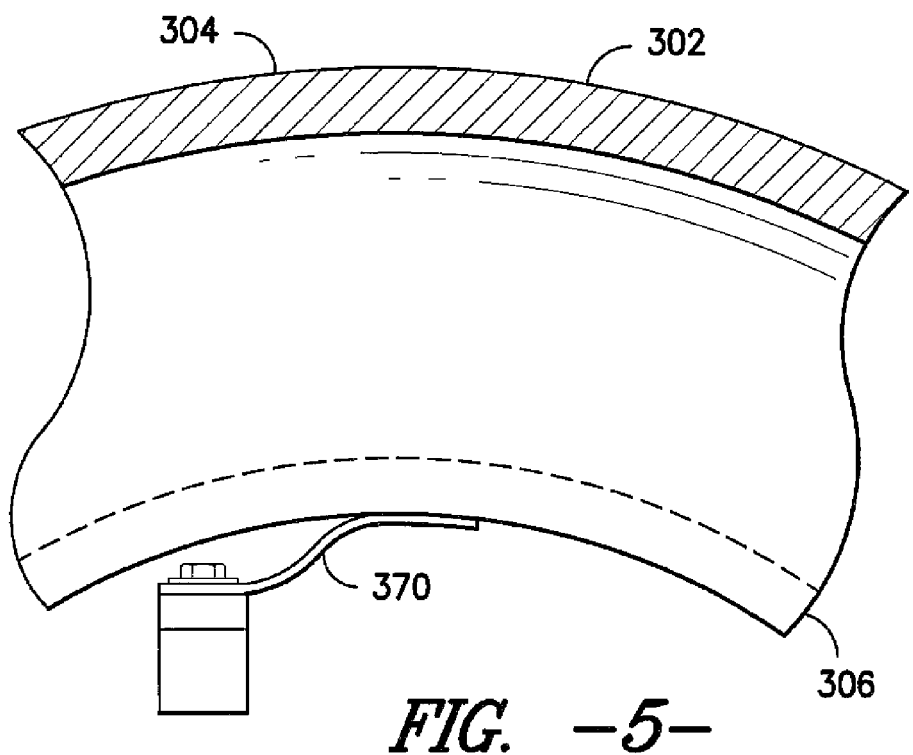
FIG. -5-

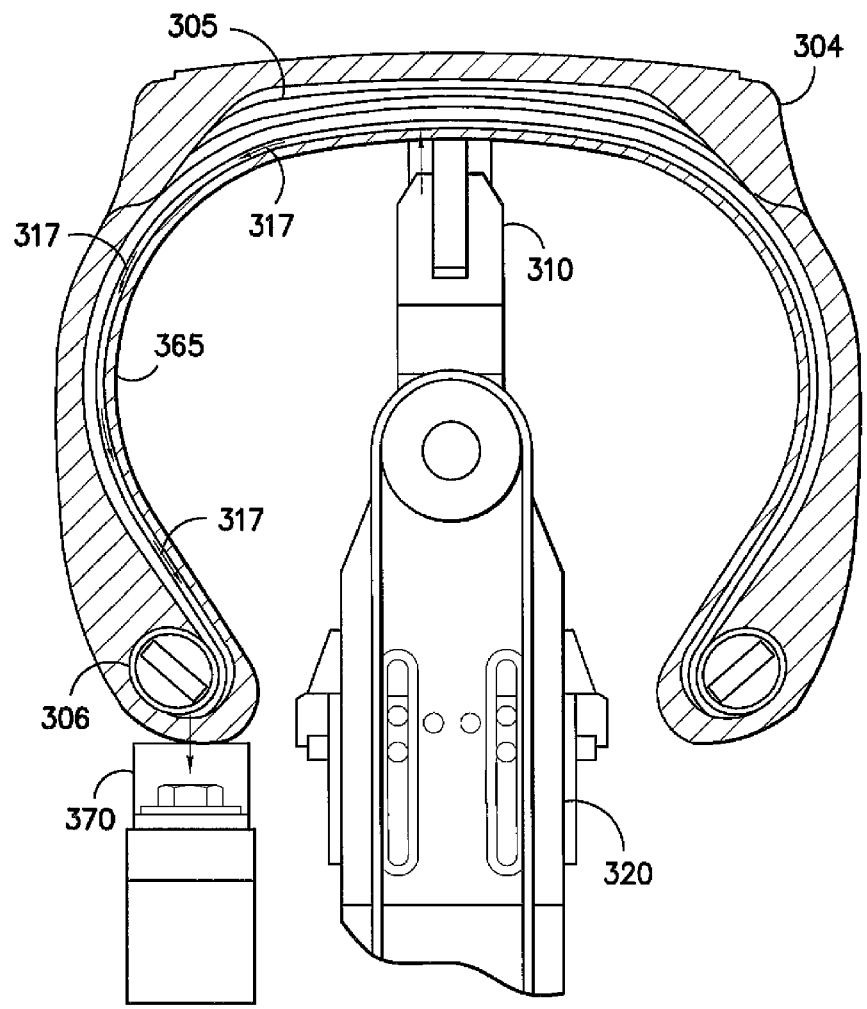
FIG. —6—

TIRE INNER LINER ANOMALY PROBE GROUNDING APPARATUS AND METHOD

FIELD OF THE INVENTION

The present invention relates generally to tire testing, and more particularly to tire surface anomaly detection.

BACKGROUND OF THE INVENTION

Tire repair operations, such as tire retreading operations, are generally used to extend the useful service life of a tire. Typical tire retreading operations include removing previously worn tread from a tire and bonding new tread in its place. Tires may be retread or repaired one or more times as a less expensive alternative to purchasing new tires, providing particular advantages for large-scale operations such as trucking, bussing and commercial aviation.

Generally, some level of non-destructive testing (NDT) of the tire prior to repair is conducted to determine whether it is appropriate to perform the repair operation. Visual inspection methods can be used to validate the integrity and, subsequently, the viability of retread and/or repair of tire casings for retread. For instance, the inside and outside surface of a tire can be visually inspected by an operator using special lighting to inspect for defects such as crazing, cracks, snags, bulges, depressions, gouges, abrasions, marbling, bubbles, blisters, separations, and other defects. Visual inspection methods, however, are subjective, inconsistent, and can require extensive training. Moreover, due to high operator turnover, difficulty exists in retaining expertise.

High voltage discharge (HVD) testing can be performed in place of or supplemental to visual inspection. HVD testing can be used to identify anomalies in the inner liner of a tire that penetrate the insulating material of the inner liner. In HVD testing machines, the tread portion of a tire is typically disposed between a pair of electrodes across which a high voltage electrical potential is generated. The voltage applied across the electrode will cause electrical discharge at the location of a defect in a tire. U.S. Pat. No. 6,050,136, which is incorporated herein by reference for all purposes, for instance, discloses a HVD test machine that employs electrical discharging to detect defects in the inner liner of a tire.

On a traditional HVD test machine, the probe assembly typically includes a series of wire loops and small chains that are positioned to hang inside the tire in a manner to distribute high voltage from bead to bead on the inside surface of the tire. The correct width probe must be chosen for the tire size. The ground path for the discharge at an anomaly is provided by contact of the tread on a metallic driven roller. When the probe passes over an anomaly, an electrical discharge passes through the tread at the location of the anomaly to the metallic driven roller.

Traditional HVD test machines suffer from several disadvantages. For instance, the detection capability of typical HVD test machines depends on many variables, including the thickness and chemical makeup of the tread portion of the tire. In particular, in typical HVD testing machines, the electrical discharge must pass through the tread portion of the tire from the high voltage probe to the metallic driven roller which acts as the reference electrode for the HVD testing machine. Variations in tread thickness result in variations in resistance due to more or less dielectric material in the electrical discharge path. This variability may be further enhanced by variations in tread compounds, such as, for instance, variations in tread compounds used for winter tires and tread compounds used for summer tires. This variability can require higher voltage to be applied to the high voltage probe to generate an electrical discharge and can lead to reduced accuracy in the detection of anomalies by the HVD testing machine.

Thus, a solution is needed for automated HVD testing of tires that provides for more uniform detection capability of anomalies. A solution that is less susceptible to tire variables, such as the thickness and chemical makeup of the tread portion of the tire, would be particularly useful. A solution that provides for a reduced voltage to be applied to a high voltage probe would also be particularly useful.

SUMMARY OF THE INVENTION

Aspects and advantages of the invention will be set forth in part in the following description, or may be obvious from the description, or may be learned through practice of the invention.

One exemplary embodiment of the present disclosure is directed to a tire inspection method. The tire inspection method includes placing a high voltage probe adjacent a surface of the tire; placing a reference electrode adjacent a bead portion of the tire; energizing the high voltage probe; imparting relative motion between the high voltage probe and the surface of the tire; and detecting one or more electrical discharges between the high voltage probe and the reference electrode to detect the presence of one or more anomalies in the surface of the tire. In a particular embodiment, the one or more electrical discharges can be conducted through one or more carcass plies of the tire.

In a variation of this exemplary embodiment, the reference electrode includes a conductive plate that maintains contact with the bead portion of the tire. In another variation of this exemplary embodiment, the high voltage probe includes a conductive spring electrode that is compressed against a surface of the tire.

In another variation of this exemplary embodiment, imparting relative motion between the high voltage probe and the surface of the tire includes rotating the inner surface of the tire with a tire rotation device about the high voltage probe. The method can include maintaining the reference electrode against the bead portion of the tire as the surface of the tire rotates about the high voltage probe.

In a further variation of this exemplary embodiment, imparting relative motion between the high voltage probe and the surface of the tire includes positioning the high voltage probe such that the high voltage probe maintains contact with the surface of the tire at a first radial position; rotating with a tire rotation device the inner surface of the tire about the surface of the high voltage probe for at least one revolution; positioning the high voltage probe such that the high voltage probe maintains contact with the surface of the tire at a second radial position; and rotating with the tire rotation device the surface of the tire about the surface of the high voltage probe for at least one revolution.

In still a further variation of this exemplary embodiment, the method includes monitoring the position of the one or more electrical discharges to determine the location of one or more anomalies on the surface of the tire.

Another exemplary embodiment of the present disclosure is directed to a tire testing apparatus. The tire testing apparatus includes a high voltage probe operable to be positioned adjacent a surface of the tire and a reference electrode operable to be positioned adjacent a bead portion of a tire. The tire testing apparatus includes a rotation device, such as a tire rotation device, that is configured to provide relative motion between the tire and the high voltage probe. The tire testing apparatus further includes a detection circuit operable to detect one or more electrical discharges between the high voltage probe and the reference electrode. For instance, the detection circuit could be operable to detect one or more electrical discharges conducted through one or more carcass plies of the tire.

In a variation of this exemplary embodiment, the reference electrode includes a conductive plate that maintains contact with the bead portion of the tire. In another variation of this exemplary embodiment, the high voltage probe includes a conductive spring electrode that is configured to be compressed against the surface of the tire.

In another variation of this exemplary embodiment, the rotation device is configured to rotate the inner surface of the tire about the high voltage probe. The reference electrode can be positioned to be maintained against the bead portion of the tire as the surface of the tire rotates about the high voltage probe.

In a further variation of this exemplary embodiment, the tire inspection apparatus further includes a high voltage probe positioning device operable to position said high voltage probe adjacent the tire surface such that the high voltage probe is maintained against the surface of the tire at a first radial position. The high voltage probe positioning device can be further configured to adjust said high voltage probe from the first radial position on the surface of the tire to a second radial position on the surface of the tire.

In still a further variation of this exemplary embodiment, the detection circuit is operable to provide a signal representative of the location of the one or more electrical discharges.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG.-1—illustrates a block diagram of an exemplary tire inspection system according to an exemplary embodiment of the present disclosure;

FIG.-2—illustrates a flow chart of exemplary method steps according to an exemplary embodiment of the present disclosure;

FIG.-3—illustrates a perspective view of an exemplary tire testing apparatus according to an exemplary embodiment of the present disclosure;

FIG.-4—illustrates an exemplary high voltage probe that can be used in an exemplary tire testing apparatus according to an exemplary embodiment of the present disclosure;

FIG.-5—illustrates an exemplary reference electrode that can be used in accordance with an exemplary embodiment of the present disclosure; and FIG.-6—illustrates a sectional view of tire being inspected using an exemplary tire testing apparatus according to an exemplary embodiment of the present disclosure.

DETAILED DESCRIPTION OF THE INVENTION

For purposes of describing the invention, reference now will be made in detail to embodiments and aspects of the invention, one or more examples of which are illustrated in the drawings. Each example is provided by way of explanation of the invention, not limitation of the invention. In fact, from the teachings disclosed herein, it will be apparent to those skilled in the art that various modifications and variations can be made in the present invention without departing from the scope or spirit of the invention. For instance, features illustrated or described as part of one embodiment, can be used with another embodiment to yield a still further embodiment. Thus, it is intended that the present invention covers such modifications and variations as come within the scope of the appended claims and their equivalents.

Generally, the present disclosure is directed to an apparatus and method for high voltage discharge testing of a tire. In particular embodiments, a high voltage probe is maintained against the surface of a tire. The high voltage probe is energized and relative motion is provided between the surface of the tire and the high voltage probe. At the presence of an anomaly that penetrates the insulating material of the tire surface, an electrical discharge will occur between the conductive spring electrode and a reference electrode.

In accordance with embodiments of the present disclosure, the reference electrode is positioned adjacent the bead portion of the tire. In this manner, an electrical discharge will not pass through the tread portion of the tire. Rather, the electrical discharge will travel from the high voltage probe through the anomaly in the surface of the tire to one or more carcass plies in the tire. The carcass plies will carry the electrical discharge to the bead portion of the tire, where the electrical discharge will pass to the reference electrode. By providing a reference electrode adjacent the bead portion of the tire, errors in surface anomaly detection caused by variations in tread thickness and variations in tread composition can be avoided. This can lead to a reduced number of false detections, leading to increased reliability of the tire inspection process. In addition, because the electrical discharge passes through less tire materials, the voltage applied to the high voltage probe to generate an electrical discharge through the tire can be reduced.

Referring to FIG.-1-, a schematic overview of an exemplary tire testing system 100 according to an exemplary embodiment of the present disclosure will now be set forth. Tire testing system 100 can be used to perform HVD testing techniques to a tire 102 to determine the presence of one or more surface anomalies in the tire 102, and to determine whether tire 102 is viable for repair or retread. As used herein, the term "anomaly" can refer to any irregularity in the surface of a tire, including defects in the tire such as crazing, cracks, snags, gouges, abrasions, penetrations, and other defects.

Tire detection system 100 can include a high voltage probe 110, a detection circuit 120, a tire rotation device 130, and a reference electrode 170. The high voltage probe 110 can be configured to be placed adjacent a surface of tire 102 and the reference electrode 170 can be configured to be placed adjacent to the bead portion of tire 102. A high voltage source 112 can provide high voltage energy, such as about 37.5 kV to about 50 kV DC voltage energy, to high voltage probe 110. High voltage source 112 can be any source configured to provide high voltage energy to high voltage probe 110. For instance, in a particular embodiment, high voltage source 112 can include a TEI Micro FS-D unit that utilizes a charge/discharge cycle for producing 50 kV DC at the high voltage probe. Those of ordinary skill in the art, using the disclosures provided herein, should understand that any high voltage source can be used without deviating from the scope of the present disclosure.

High voltage probe 110 can be maintained against the surface of tire 102 using a high voltage probe positioning device. The high voltage probe positioning device can be controlled by controller 150 to automatically position the high voltage probe 110 against the surface of the tire 102. Tire rotation device 130 can be controlled by controller 150 to impart relative motion between the high voltage probe 110 and the surface of tire 102. For instance, tire rotation device 130 can be used to rotate the inner surface of the tire 102 over high voltage probe 110. The reference electrode 170 can be positioned so as to be maintained against the bead portion of the tire 102 as the inner surface of the tire 102 rotates over high voltage probe 110. When the high voltage probe 110 passes over an anomaly that penetrates the tire surface, an electrical discharge will occur between the high voltage probe 110 and the reference electrode 170. The location of the electrical discharge provides an indication of the location of an anomaly in the surface of tire 102.

Detection circuit 120 can be used to detect the presence of an electrical discharge between the high voltage probe 110 and the reference electrode 170. A variety of detection circuits 120 for detecting electrical discharges are known. Any known detection circuit 120 for detecting an electrical discharge between high voltage probe 110 and the reference electrode 170 can be used without deviating from the scope of the present disclosure. For instance, in a particular embodiment, detection circuit can include an off the shelf component from TEI. Detection circuit 120 can include various electronic devices to monitor the voltage and/or voltage frequency at the high voltage probe 110. Changes in the voltage and/or frequency at the high voltage probe 110 can indicate the presence of an electrical discharge. Detection circuit 120 can be coupled with azimuthal and radial feedback circuits that provide position feedback signals indicating the precise azimuthal and radial location of the electrical discharge. In this manner, detection circuit 120 can provide data associated with the occurrence and precise location an electrical discharge to computing system 140.

Computing system 140 can be used to control, through controller 150, various aspects of system 100, as well as to store and analyze information received from detection circuit 120 during a tire inspection process. In particular, computing system 140 can include one or more processor(s) 142 configured to receive input data including data from detection circuit 120 and to provide useable output such as data to a user or signals to process controller 150. For instance, in a particular embodiment, processor(s) 142 can use data received from detection circuit 120 to generate a graphical representation, such as a two-dimensional map or other suitable graphical representation, of the tire surface.

Various memory/media elements 144 can be provided as a single or multiple portions of one or more varieties of computer-readable media, such as, but not limited to, any combination of volatile memory (e.g., random access memory (RAM, such as DRAM, SRAM, etc.) and nonvolatile memory (e.g., ROM, flash, hard drives, magnetic tapes, CD-ROM, DVD-ROM, etc.) or any other memory devices including diskettes, drives, other magnetic-based storage media, optical storage media and others. Although FIG.-1—shows three separate memory/media elements 144a, 144b and 144c, the content dedicated to such devices may actually be stored in one memory/media element or in multiple elements. Any such possible variations and other variations of data storage, using the disclosures provided herein, will be appreciated by one of ordinary skill in the art.

The computing/processing devices of FIG.-1—may be adapted to function as a special-purpose machine providing desired functionality by accessing software instructions rendered in a computer-readable form stored in one or more of the memory/media elements (e.g., memory/media element 144b). When software is used, any suitable programming, scripting, or other type of language or combinations of languages may be used to implement the teachings contained herein. In other embodiments, the methods disclosed herein may alternatively be implemented by hard-wired logic or other circuitry, including, but not limited to application-specific circuits.

Other memory/media elements (e.g., memory/media elements 144a, 144c) are used to store data which will also be accessible by the processor(s) 142 and which will be acted on per the software instructions stored in memory/media element 144b. For example, memory/media element 144a can include input data corresponding to the occurrence and location of electrical discharges obtained from the detection circuit 120 as well as any predetermined parameters, such as but not limited to, control parameters, such as high voltage probe parameters, detection circuit parameters, tire rotation parameters, other suitable control parameters, and tire parameters, such as tire radius, tire width, tire summit mass, tire pressure, tire radial stiffness, tire tangential stiffness, tire bending stiffness, tire extensional stiffness, tread locations, general tire data and the like. Such predetermined parameters may be pre-programmed into memory/media element 144a or provided for storage therein when entered as input data from a user accessing the input device 146.

Input device 146 may correspond to one or more peripheral devices configured to operate as a user interface with image processing system 140. Exemplary input devices may include but are not limited to a keyboard, touch-screen monitor, microphone, mouse and other suitable input devices.

Second memory element 144b can include computer-executable software instructions that can be read and executed by processor(s) 142 to act on the input data stored in memory/media element 144a to create new output data (e.g., anomaly identification and location) for storage in a third memory/media element 144c. Selected portions of the output data may then be provided to one or more peripheral output devices 148.

Output device 148 may correspond to a display such as a monitor, screen, or other visual display, a printer, or the like. Another specific form of output device may correspond to a process controller 150. In one embodiment, process controller 150 assists the overall tire manufacturing process by coordinating operating parameters of high voltage probe 110, a high voltage probe positioning device, tire rotation device 130, and other process parameters.

Referring to FIG.-2-, an exemplary automated tire testing method 200 for inspecting a surface of a tire for anomalies will now be discussed. At 202, the method 200 includes placing a high voltage probe adjacent to the tire surface. For instance, a high voltage probe positioning device can position the high voltage probe such that a conductive spring electrode on the high voltage probe is compressed against the surface of the tire. While the present disclosure will be discussed with reference to the exemplary high voltage probe 310 illustrated in FIG.-4-, those of ordinary skill in the art should understand that any high voltage probe suitable for HVD testing of tire can be used without deviating from the scope of the present disclosure. For instance, in a particular embodiment, the high voltage probe can include a series of chains and wire loops positioned to hang inside the tire in a manner to distribute high voltage from bead to bead on the inside surface of the tire.

At 204, the method 200 includes positioning a reference electrode adjacent a bead portion of the tire. As will be discussed in greater detail below, positioning the reference electrode adjacent the bead portion of the tire provides an alternative electrical discharge path between the high voltage probe and the reference electrode that avoids traveling through the tread portion of the tire.

At 206, the method 200 includes energizing the high voltage probe with a high voltage. For instance, a high voltage source can provide a high voltage, such as from about 37.5 kV to about 50 kV DC, to the high voltage probe. Once the high voltage probe is energized, the method 200 includes imparting relative motion between the tire surface and the high voltage probe as shown at 208. This can be performed by either rotating the surface of the tire about the high voltage probe or by rotating the high voltage probe around the surface of the tire. A tire rotation device, such as tire rotation device 330 of FIG.-3—can be used to rotate an inner surface of a tire about a high voltage probe.

In a particular embodiment, imparting relative motion between the surface and the high voltage probe includes adjusting the radial position after a complete revolution of the tire about the high voltage probe. For instance, the method 200 can include positioning the high voltage probe such that the high voltage probe is maintained against the surface of the tire at a first radial position. The method 200 then rotates the surface of the tire about the high voltage probe for at least one revolution. The method 200 then positions the high voltage probe such that the high voltage probe is maintained against the surface of the tire at a second radial position. Preferably, the second radial position is immediately adjacent to the first radial position. The method 200 then rotates the surface of the tire about the high voltage probe a second time for at least one revolution. In this manner, the high voltage probe can be used to scan the entire inner surface of the tire from bead to bead.

At 210, the method 200 includes detecting an electrical discharge between the high voltage probe and a reference electrode at the location of an anomaly. As discussed above, when a high voltage probe energized with high voltage passes over an anomaly that penetrates the liner of the tire, an electrical discharge will occur between the high voltage probe and a reference electrode. Once an electrical discharge is detected, an electrical signal representative of the location and occurrence of the electrical discharge can be provided to a computing device for analysis. For instance, in a particular embodiment, data can be collected for a fixed number of azimuthal points at each radial position on the surface of the tire. The data can include the radial position of the high voltage probe, the azimuthal location of the high voltage probe relative to the tire surface, and the binary state of a defect detection signal. The collected data can then be used to generate a graphical depiction of the tire surface, for instance, in the form of a two dimensional map or other suitable graphical depiction, for viewing and analysis by an operator.

FIG.-3—depicts an exemplary tire testing apparatus 300 according to an exemplary embodiment of the present disclosure. Tire testing apparatus 300 includes a high voltage probe 310, a high voltage probe positioning device 320, and a tire rotation device 330. Tire rotation device 330 includes one or more rollers 332. The bead portion of tire 302 rests on one or more rollers 332. Although not illustrated in FIG.-3-, the bead portion of tire 302 can also be configured to be maintained adjacent a reference electrode. The rollers 332 are configured to impart motion to tire 302, for instance by continuously rotating tire 302 over high voltage probe 310. Tire 302 is placed over the top of high voltage probe 310 so that high voltage probe 310 can test the inner surface of tire 302 for anomalies.

High voltage probe positioning device 320 is used to position high voltage probe 310 adjacent a first radial position on the inner surface of tire 302. Tire rotation device 132 rotates the tire 102 over the high voltage probe 310 for at least one complete tire revolution. The high voltage probe positioning device 320 can then be used to position the high voltage probe 310 adjacent a second radial position on the inner surface of tire 302. Tire rotation device 330 then rotates tire 302 over the high voltage probe for at least one complete tire revolution. The process can be repeated until the entire inner surface from bead to bead of the tire 302 has been tested for anomalies.

FIG.-4—provides a perspective view of the exemplary high voltage probe 310 used in the tire testing apparatus 300 of FIG.-3-. High voltage probe 310 includes a high voltage connection point 315 for connecting the high voltage probe 310 to a high voltage energy source. Any suitable connection to a high voltage energy source can be used without deviating from the scope of the present disclosure. For instance, the high voltage connection point 315 can be adapted to receive a shielded, flexible high voltage cable from a high voltage source.

High voltage probe 310 further includes an insulating casing 314, a spacing roller 316, and a conductive spring electrode 318. Insulating casing 314 can be composed of any material sufficient to insulate high voltage energy such as, for instance, about 50 kV DC. Insulating casing 314 is used to insulate various components of high voltage probe 310 and other components of the tire testing apparatus from an energized conductive spring electrode 318.

Conductive spring electrode 318 is used to apply high voltage energy to the surface of a tire. Conductive spring electrode 318 has a shape and configuration adapted to be compressed against the surface of the tire when spacing roller 316 maintains contact with the tire surface. As the conductive spring electrode 318 is compressed, the elasticity of the conductive spring electrode 318 causes the conductive spring electrode 318 to maintain contact with the tire surface, even when the conductive spring electrode 318 passes over slight elevations in the tire surface. In this manner, the tire testing apparatus 300 is not susceptible to error caused by slight elevation changes in the tire surface and provides for more accurate detection of anomalies.

Conductive spring electrode 318 can be constructed of any suitable conductive material. For instance, in a particular embodiment, conductive spring electrode 318 is composed of steel. However, other suitable conductors, such as aluminum, copper, gold, etc., can be used to construct conductive spring electrode 318 as desired.

FIG.-5—depicts the positioning of an exemplary reference electrode 370 adjacent the bead portion 306 of tire 302. Reference electrode 370 can be coupled to a reference voltage such as a ground potential. Reference electrode 370 includes a conductive plate adapted to be maintained against the bead portion 306 of tire 302 as the tire 302 rotates about high voltage probe 310. In particular embodiments, the conductive plate can have a degree of elasticity such that the conductive plate is maintained adjacent the bead portion of the tire. Reference electrode 370 can be mounted to tire rotation device 330 of FIG.-3—such that the bead portion 306 of tire 302 rests on reference electrode 370. As the tire rotation device 330 of FIG.-3—rotates tire 302 about high voltage probe 310, the bead portion 306 of tire 302 is maintained adjacent to reference electrode 370.

The conductive plate can be constructed of any suitable conductive material. For instance, in a particular embodiment, conductive plate is composed of steel. However, other suitable conductors, such as aluminum, copper, gold, etc., can be used to construct conductive spring electrode 318 as desired.

An exemplary conductive path through tire 302 for an electrical discharge from high voltage probe 310 to reference electrode 370 is illustrated in FIG.-5-. As shown, high voltage probe 310 is positioned adjacent the inner surface of tire 302. Reference electrode 370 is positioned adjacent bead portion 306 of tire 302. Once energized, if high voltage probe 310 passes over an anomaly in the tire surface, an electrical discharge will occur between high voltage probe 310 and reference electrode 370. This electrical discharge does not pass through the tread portion 304 of tire 302. Rather, the electrical discharge will be conducted through one or more carcass plies 365 in the tire 302. As indicated by arrows 317, the electrical discharge will travel from high voltage probe 310, through carcass plies 365, to bead portion 306 of tire 302. The electrical discharge will then pass to reference electrode 370. This provides for a lower resistance and more consistent conductive path for the electrical discharge.

For instance, as illustrated in FIG. 5, tread portion 304 of tire 302 includes numerous layers and materials, including one or more carcass plies 365 and other layers 305. An electrical discharge that travels through the tread portion of the tire must pass through the inner liner, one or more carcass plies 365 and additional layers 305. Moreover, the tread thickness and chemical composition will further affect the resistance of the electrical discharge path.

In contrast, by maintaining the reference electrode 370 adjacent the bead portion 306 of tire 302, the electrical discharge only has to travel through the inner liner and one or more carcass plies 365. Because the electrical discharge path passes through less materials, the resistance of the electrical discharge path will be lower. This allows for lower high voltage energy to be applied to the high voltage probe 310 during a tire inspection process. For instance, 37.5 kV DC may be sufficient to generate an electrical discharge between the high voltage probe 310 and the reference electrode 370, as opposed to 50 kV when a reference electrode is maintained adjacent the tread portion 304 of tire 302. It has also been shown that positioning the reference electrode 370 adjacent the bead portion 306 of tire 302 results in fewer false detections of surface anomalies.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A tire inspection method, comprising:
   placing a high voltage probe against a surface of the tire;
   placing a reference electrode against a bead portion of the tire;
   energizing the high voltage probe;
   imparting relative motion between the high voltage probe and the surface of the tire as the reference electrode is maintained against the bead portion of the tire; and
   detecting one or more electrical discharges between the high voltage probe and the reference electrode to detect the presence of one or more anomalies in the surface of the tire.

2. The tire inspection method of claim 1, wherein the one or more electrical discharges are conducted through one or more carcass plies of the tire.

3. The tire inspection method of claim 1, wherein the reference electrode comprises a conductive plate that maintains contact with the bead portion of the tire.

4. The tire inspection method of claim 1, wherein the high voltage probe comprises a conductive spring electrode that is compressed against a surface of the tire.

5. The tire inspection method of claim 1, wherein imparting relative motion between the high voltage probe and the surface of the tire comprises rotating the inner surface of tire with a tire rotation device about the high voltage probe.

6. The tire inspection method of claim 5, wherein the method comprises maintaining the reference electrode against the bead portion of the tire as the surface of the tire rotates about the high voltage probe.

7. The tire inspection method of claim 1, wherein imparting relative motion between the high voltage probe and the surface of the tire comprises:
   positioning the high voltage probe such that the high voltage probe maintains contact with the surface of the tire at a first radial position;
   rotating with a tire rotation device the inner surface of the tire about the surface of the high voltage probe for at least one revolution;
   positioning the high voltage probe such that the high voltage probe maintains contact with the surface of the tire at a second radial position; and
   rotating with the tire rotation device the surface of the tire about the surface of the high voltage probe for at least one revolution.

8. The method of claim 1, wherein the method further comprises monitoring the position of the one or more electrical discharges to determine the location of one or more anomalies on the surface of the tire.

9. A tire testing apparatus, comprising:
   a high voltage probe operable to be maintained against a surface of the tire;
   a reference electrode operable to be maintained against a bead portion of a tire;
   a rotation device configured to provide relative motion between the tire and the high voltage probe; and
   a detection circuit operable to detect one or more electrical discharges between the high voltage probe and the reference electrode.

10. The tire inspection apparatus of claim 9, wherein the one or more electrical discharges are conducted through one or more carcass plies of the tire.

11. The tire inspection apparatus of claim 1, wherein the reference electrode comprises a conductive plate that maintains contact with the bead portion of the tire.

12. The tire inspection apparatus of claim 9, wherein the rotation device is configured to rotate the inner surface of the tire about the high voltage probe.

13. The tire inspection apparatus of claim 9, wherein the reference electrode is positioned to be maintained against the bead portion of the tire as the surface of the tire rotates about the high voltage probe.

14. The tire inspection apparatus of claim 9, wherein the high voltage probe comprises a conductive spring electrode that is compressed against a surface of the tire.

15. The tire inspection apparatus of claim 14, wherein the tire inspection apparatus further comprises a high voltage probe positioning device operable to position said high voltage probe adjacent the tire surface such that said conductive spring electrode is compressed against the surface of the tire at a first radial position.

16. The tire inspection apparatus of claim 15, wherein said high voltage probe positioning device is configured to adjust said high voltage probe from the first radial position on the surface of the tire to a second radial position on the surface of the tire.

17. The tire inspection apparatus of claim 9, wherein said detection circuit is operable to provide a signal representative of the azimuthal and radial position of the one or more electrical discharges.

* * * * *